United States Patent
Ha

(10) Patent No.: US 10,616,814 B2
(45) Date of Patent: Apr. 7, 2020

(54) LOAD BALANCING IN FEMTOCELLS

(75) Inventor: Kwang-Jun Ha, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 828 days.

(21) Appl. No.: 13/453,022

(22) Filed: Apr. 23, 2012

(65) Prior Publication Data
US 2012/0270553 A1    Oct. 25, 2012

(30) Foreign Application Priority Data
Apr. 22, 2011 (KR) .......................... 10-2011-0038037

(51) Int. Cl.
*H04W 36/22* (2009.01)
*H04W 84/04* (2009.01)

(52) U.S. Cl.
CPC .......... *H04W 36/22* (2013.01); *H04W 84/045* (2013.01); *Y02D 70/122* (2018.01); *Y02D 70/1262* (2018.01); *Y02D 70/146* (2018.01)

(58) Field of Classification Search
CPC ............................ H04W 36/22; H04W 84/045
USPC ......... 455/438, 517, 437, 440; 370/259, 252
See application file for complete search history.

(56) References Cited

U.S. PATENT DOCUMENTS

| 8,630,650 | B2 | 1/2014 | Lee |
| 2008/0085712 | A1* | 4/2008 | Han ............................... 455/440 |
| 2009/0098858 | A1 | 4/2009 | Gogic |
| 2010/0085884 | A1* | 4/2010 | Srinivasan et al. ............ 370/252 |
| 2010/0112980 | A1 | 5/2010 | Horn et al. |
| 2010/0130212 | A1 | 5/2010 | So et al. |
| 2010/0265827 | A1 | 10/2010 | Horn et al. |
| 2010/0323711 | A1 | 12/2010 | Damnjanovic et al. |
| 2011/0069659 | A1 | 3/2011 | Kong et al. |
| 2011/0194462 | A1* | 8/2011 | Wu ............................... 370/259 |
| 2011/0237258 | A1* | 9/2011 | Nylander et al. ............. 455/437 |
| 2011/0244870 | A1* | 10/2011 | Lee ..................... H04W 52/244 455/444 |
| 2011/0269471 | A1* | 11/2011 | Gao .................. H04W 36/0077 455/437 |
| 2012/0087266 | A1 | 4/2012 | Vajapeyam et al. |
| 2012/0129536 | A1 | 5/2012 | Zou et al. |

(Continued)

FOREIGN PATENT DOCUMENTS

| JP | 2007-129405 A | 5/2007 |
| JP | 2008-270919 A | 11/2008 |

(Continued)

OTHER PUBLICATIONS

P. J. Song et al., "LTE Mobility Management for Network Convergence", Electronics and Telecommunications Trends, Dec. 2010, pp. 38-49, vol. 25, No. 6, Electronics and Telecommunications Research Institute.

(Continued)

*Primary Examiner* — Shahriar Behnamian
(74) *Attorney, Agent, or Firm* — IP Legal Services, LLC

(57) ABSTRACT

A method may be provided for load balancing in femtocells. Determination may be made as to whether a cell load status of the femtocell base station exceeds a certain load level. When the cell load status of the femtocell base station reaches and/or exceeds the certain load level, handover of at least one user equipment coupled to the femtocell base station to a target base station may be initiated by shrinking cell coverage of the femtocell base station.

8 Claims, 7 Drawing Sheets

(56) References Cited

U.S. PATENT DOCUMENTS

2012/0282979 A1 11/2012 Ashraf et al.
2013/0005388 A1* 1/2013 Naka ................... H04W 52/244
                                              455/522
2014/0179324 A1 6/2014 Lee
2014/0295846 A1 10/2014 Ashraf et al.

FOREIGN PATENT DOCUMENTS

| KR | 10-0883268 B1 | | 2/2009 | |
|----|----|----|----|----|
| KR | 10-2010-0070279 A | | 6/2010 | |
| KR | 20100066524 A | * | 6/2010 | ............ H04W 60/00 |
| KR | 10-2011-0031097 A | | 3/2011 | |
| WO | 2010/048583 A2 | | 4/2010 | |
| WO | WO 2010078676 A1 | * | 7/2010 | ........ H04W 36/0077 |
| WO | 2010/0121198 A1 | | 10/2010 | |
| WO | 2010/121635 A1 | | 10/2010 | |
| WO | 2011/029497 A1 | | 3/2011 | |

OTHER PUBLICATIONS

ETSI TS 136 423 V9.0.0, "LTE; Evolved Universal Terrestrial Radio Access Network (E-UTRAN); X2 Application Protocol (X2AP) (3GPP TS 36.423 version 9.0.0 Release 9)", ETSI, Oct. 2009, pp. 1-102.

* cited by examiner

LOAD BALANCING IN FEMTOCELLS

CROSS REFERENCE TO PRIOR APPLICATIONS

The present application claims priority under 35 U.S.C. § 119 to Korean Patent Application No. 10-2011-0038037 (filed on Apr. 22, 2011), which is hereby incorporated by reference in its entirety.

FIELD OF THE INVENTION

The present invention relates to communications and, in particular, to base station load balancing in femtocells.

BACKGROUND OF THE INVENTION

A femtocell base station is designed to connect user equipment located in a femtocell to a service provider's network. A femtocell may denote a small service area covered by a femtocell base station. For example, the femtocell may be a home or a small business office in a cellular system. The range of a femtocell base station may be about 10 meters. The femtocell base station has been applied to a Long Term Evolution (LTE) communication network. The 3$^{rd}$ Generation Partnership Project (3GPP) has introduced standard-specifications for LTE technology. In 3GPP LTE standard specifications, the femtocell base station has been defined as well as a macrocell base station. The femtocell base station may be referred to as a Home NodeB (HNB) for a 3G femtocell or as a Home Evolved Node Base station (HeNB) for an LTE femtocell. The macrocell base station may be referred to as an evolved NodeB (eNB).

3GPP LTE standard specifications also define an X2 interface. The X2 interface may be a logical interface between two macrocell base stations, such as eNBs. For example, the X2 interface may be a point to point link between eNBs, but a physical relation thereof need not be a point to point link. The X2 interface may allow eNBs to be interconnected with each other. The macrocell base stations may exchange signaling information including control data through the X2 interface. That is, the macrocell base stations may perform handover and load balancing by exchanging information through the X2 interface. Particularly, the X2 interface may enable functions of mobility management, load management, inter-cell interference coordination, general X2 management and error handling, application level data exchange between eNBs, and Trace function.

As described above, the X2 interface may provide various functions and macrocell base stations may be efficiently managed through many management tasks of the X2 interface. Femtocell base stations may perform various tasks similar to those of macrocell base stations. Femtocell base stations may need the functions of the X2 interface in order to exchange signal information, for handover, and/or for load balancing. However, the 3GPP LTE standard specification does not define an X2 interface for femtocell base stations such as, for example, HeNBs or HNBs Particularly, for load balancing, a typical femtocell base station simply denies access of user equipment when the typical femtocell base station has a load exceeding a certain threshold. Such a load balancing policy for the typical femtocell base station is not necessarily efficient because neighbor femtocell base stations may have available resources to accept additional user equipment.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an X2 interface may be established between femtocell base stations and loads in femtocells may be balanced through the X2 interface.

In accordance with another aspect of the present invention, user equipments may be handed over from a femtocell base station to another through an X2 interface stabled between the femtocell base stations.

In accordance with another aspect of the present invention, interference between femtocells may be controlled by controlling cell coverage of femtocells.

In accordance with another aspect of the present invention, handing over user equipments may be differently controlled according to subscriber information of user equipments.

In accordance with an embodiment of the present invention, a method may be provided for load balancing in femtocells at a femtocell base station. The method may include determining whether a cell load status of the femtocell base station exceeds a certain load level, and initiating handover of at least one user equipment coupled to the femtocell base station to a target base station by shrinking cell coverage of the femtocell base station when the cell load status of the femtocell base station exceeds the certain load level.

The determining may include monitoring the at least one load status item of the femtocell base station, comparing the monitored at least one load status item with a related threshold, and determining whether the cell load status of the femtocell base station reaches a certain load level based on the comparison result.

The method may include indicating, with the at least one load status item, the cell load status of the femtocell base station and setting the related threshold corresponding the at least one load status item. The at least one load status item may includes a central processing unit (CPU) load rate, a number of resource blocks, a traffic amount, and a number of user equipments coupled to the femtocell base station.

Prior to the initiating handover, the method may include determining the target femtocell base station from neighbor femtocell base stations based on cell load statuses of the neighbor femtocell base stations, and establishing an X2 interface to the target femtocell base station.

For the determining the target femtocell base station, the target femtocell base station may be selected by a femtocell base station management system. The femtocell base station management system may receive cell load statuses from the neighbor base stations, select one having a lowest cell load status as the target femtocell base station among the neighbor base stations, and inform the femtocell base station of the selected target femtocell base station.

The establishing an X2 interface may include requesting cell information of the target femtocell base station to the femtocell base station management system and receiving the requested cell information from the femtocell base station management system, transmitting an X2 interface setup request message to the target femtocell base station based on the received cell information of the target femtocell base station, and receiving an X2 interface setup response message from the target femtocell base station in response to the X2 interface setup request message.

Handover of the at least one user equipment coupled to the first femtocell base station to the target femtocell base station may be through establishing the X2 interface between the femtocell base station and the target femtocell base station.

In the shrinking cell coverage of the femtocell base station, transmission power of the first femtocell base station may be reduced by a unit power level.

The method may include reporting the cell load status of the femtocell base station to a femtocell base station management system when the cell load status of the femtocell base station based on the certain load level.

In accordance with another embodiment of the present invention, a method may be provided for load balancing in femtocells at a first femtocell base station. The method may include expanding cell coverage of the first femtocell base station in response to a request from at least one of a second femtocell base station and a femtocell base station management system, and controlling access of at least one user equipment for handover from the second femtocell base station based on subscriber information of each user equipment.

The expanding cell coverage may include increasing transmission power of the first femtocell base station by a unit power level. The expanded cell coverage of the first femtocell base station may initiate handover of one or more of the user equipment coupled to the second femtocell base station to the first femtocell base station.

Prior to the controlling, the method may include establishing an X2 interface to the second femtocell base station by receiving an X2 setup request message from the second femtocell base station and transmitting an X2 setup response message to the second femtocell base station in response to the X2 setup request message.

Handover of each user equipment may be through the X2 interface established between the first femtocell base station and the second femtocell base station.

The controlling may include allowing access for handover to the user equipment having a closed subscriber group (CSG) identity identical to that of the first femtocell base station first among the one or more user equipment from the second femtocell base station, and denying access for handover to the user equipments not having the CSG identity when a number of user equipment currently coupled to the first femtocell base station exceeds a total allowable number. The CSG identity may be included in a CSG list stored in each user equipment and the subscriber information of the user equipments may include information on the CSG identity and the CSG list.

The method may further include measuring an interference amount of neighbor cells of the first femtocell base station after expanding the cell coverage of the first femtocell base station, and reducing transmission power of the first femtocell base station by a unit power level when the measured interference amount exceeds a related threshold.

After the controlling, the method may include shrinking the expanded cell coverage of the first femtocell base station to initial cell coverage by reducing the transmission power of the first femtocell base station when a femtocell base station management system informs the first femtocell base station that a cell load status of the serving femtocell base station is lower than a related threshold.

In accordance with another embodiment of the present invention, a femtocell base station may include a monitor unit, a cell coverage control unit, an access control unit. The monitor unit may be configured to determine whether a cell load status of the femtocell base station reaches a certain load level. The cell coverage control unit may be configured to shrink cell coverage of the femtocell base station when the cell load status reaches the certain load level by reducing transmission power of the femtocell base station. The access control unit may be configured to provide handover to at least one user equipment coupled to the femtocell base station to a target base station through an X2 interface when the cell coverage is shrunk by the cell coverage control unit.

The femtocell base station may further include an X2 interface unit. The X2 interface unit may be configured to establish the X2 interface to the target femtocell base station by requesting cell information of the target femtocell base station to a femtocell base station management system, receiving the requested cell information from the femtocell base station management system, transmitting an X2 interface setup request message to the target femtocell base station based on the received cell information of the target femtocell base station, and receiving an X2 interface setup response message from The cell coverage control unit may be configured to expand cell coverage of the femtocell base station by increasing transmission power of the femtocell base station by a unit power level in response to a request from at least one of a serving femtocell base station and a femtocell base station management system; and The access control unit may be configured to allow handover access of user equipment having a closed subscriber group (CSG) identity identical to that of the femtocell base station first among the user equipments handed over from the serving femtocell base station, and to deny handover access of user equipment not having the CSG identity when a number of user equipment currently coupled to the femtocell base station exceeds a total allowable number. The CSG identity may be included in a CSG list stored in each user equipment and the subscriber information of the user equipments may include information on the CSG identity and the CSG list.

The femtocell base station may further include a cell interference control unit. The interference control unit may be configured to measure an interference amount of neighbor cells of the femtocell base station after expanding the cell coverage of the femtocell base station and to reduce transmission power of the femtocell base station by a unit power level when the measured interference amount exceeds a related threshold.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
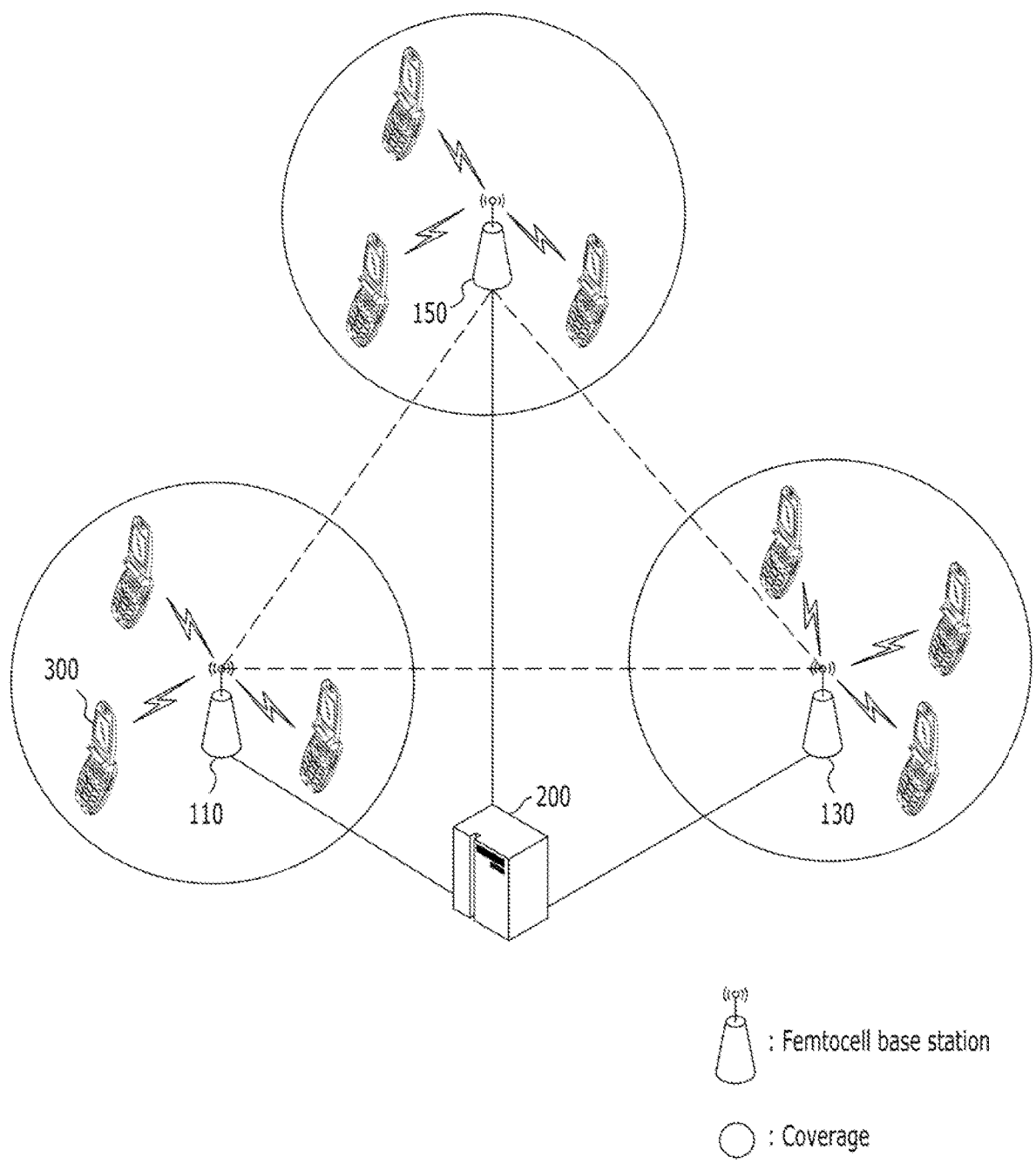
FIG. 1 shows a long term evolution (LTE) network employing embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

Embodiments of the present invention will be described as being applied to a long term evolution (LTE) network. The present invention, however, is not limited thereto. Embodiments of the present invention might be similarly applied to other communication networks such as, for example, global system for mobile communication (GSM), code division multiple access 2000 (CDMA-2000), time division synchronous code division multiple access (TD-SCDMA), worldwide interoperability for microwave access (WiMAX), and wireless broadband (WiBro). Hereinafter, load balancing in femtocells using an X2 interface in accordance with an embodiment of the present invention will be described with reference to the accompanying drawings.

FIG. 1 shows an LTE network employing embodiments of the present invention.

Referring to FIG. 1, an LTE network may include a plurality of femtocell base stations 110, 130, and 150, and femtocell base station management system 200. Femtocell base stations 110, 130, and 150 may each be referred to as a home evolved node base station (HeNB). Femtocell base station management system 200 may be referred to as a home eNodeB management system (HeMS).

Femtocell base stations 110, 130, and 150 may provide communication services to corresponding user equipment located in corresponding femtocells. For example, femtocell base stations 110, 130, and 150 may connect user equipment over wireless air interface to a service provider's network. In general, femtocell base stations 110, 130, and 150 may be installed in a protected or an indoor place, such as home, an office building, and a shopping mall. Femtocell base stations 110, 130, and 150 may control cell coverage through controlling transmission power. For example, femtocell base stations, 110, 130, and 150 may expand or shrink cell coverage by increasing and decreasing transmission power.

Femtocell base station management system 200 may manage femtocell base stations 110, 130, and 150. Femtocell base station management system 200 may perform configuration management (CM), fault management (FM), and performance management (PM). Furthermore, femtocell base station management system 200 may identify femtocell base stations and verify locations of femtocell base stations. Femtocell base station management system 200 may provide functionality of discovery and assignment of a serving management system, a serving security gateway (SeGW), and mobility management entity (MME). In addition, femtocell base station management system 200 may upload and download files related to femtocell base station managements.

Femtocell base station management system 200 may establish a secure Internet Protocol (IP) connectivity to femtocell base stations 110, 130, and 150 and set up a session based on a communication protocol. For example, femtocell base station management system 200 may employ a technical report (TR)-069 protocol for managing femtocell base stations 110, 130, and 150. The TR-069 protocol may provide communication between customer-premises equipment (CPE) and auto configuration servers (ACS) based on a simple object access protocol (SOAP) and a hypertext transfer protocol (HTTP). Femtocell base station management system 200 may set up a TR-069 session to femtocell base stations 110, 130, and 150 and exchange messages defined in the TR-069 protocol with femtocell base stations 110, 130, and 150.

Femtocell base stations 110, 130, and 150 may be classified into a serving femtocell base station, a target femtocell base station, and a neighbor femtocell base station. The serving femtocell base station may denote a femtocell base station that user equipment is currently coupled to. The target femtocell base station may denote a femtocell base station that user equipment will be handed over to. The neighbor femtocell base station may denote femtocell base stations located near to the serving femtocell base station and the target femtocell base station. For convenience and ease of understanding, femtocell base station 110 will be described as the serving femtocell base station, femtocell base station 130 will be described as the target femtocell base station, and femtocell base station 150 will be described as the neighbor femtocell base station.

Serving femtocell base station 110, target femtocell base station 130, and neighbor femtocell base station 150 may be directly coupled to each other through an X2 interface in accordance with an embodiment of the present invention.

Typically, the X2 interface may be established between macrocells for exchanging control information. The 3GPP LTE standard specifications define the X2 interface for macrocells. The X2 interface may enable handover and load balancing. However, an X2 interface for femtocells are not defined in the 3GPP LTE standard specifications. In accordance with an embodiment of the present invention, an X2 interface may be established among femtocell base stations 110, 130, and 150. Handover of user equipment from serving femtocell base station 110 to target femtocell base station 130 might use the established X2 interface. That is, load balancing of femtocell base stations 110, 130, and 150 may be accomplished by communication through the established X2 interface.

In accordance with an embodiment of the present invention, cell coverage of femtocell base stations 110, 130, and 150 may be controlled according to the amount of data traffic of each femtocell base station 110, 130, or 150. For example, when the data traffic amount of serving femtocell base station 110 exceeds a certain threshold, serving femtocell base station 110 may shrink cell coverage and target femtocell base station 130 may expand cell coverage. Accordingly, handover of user equipment 300 occurs from serving femtocell base station 110 to target femtocell base station 130.

During handover, target femtocell base station 130 may adjust access, priority, and/or handover conditions for user equipment according to a member status of the user equipment in accordance with an embodiment of the present invention.

Furthermore, interference of serving femtocell base station 110, target femtocell base station 130, and neighbor femtocell base station 150 may be measured and the measured interference may be compared with a certain threshold. Based on the comparison result, levels and or/effects of interference may be controlled.

Hereinafter, femtocell base stations 110, 130, and 150 will be described in detail with reference to FIG. 2. For convenience and ease of understanding, femtocell base station 110 will be described representatively. Femtocell base stations 130 and 150 may have a structure similar to that of femtocell base station 120 and operate in an analogous manner.

Figure 2:
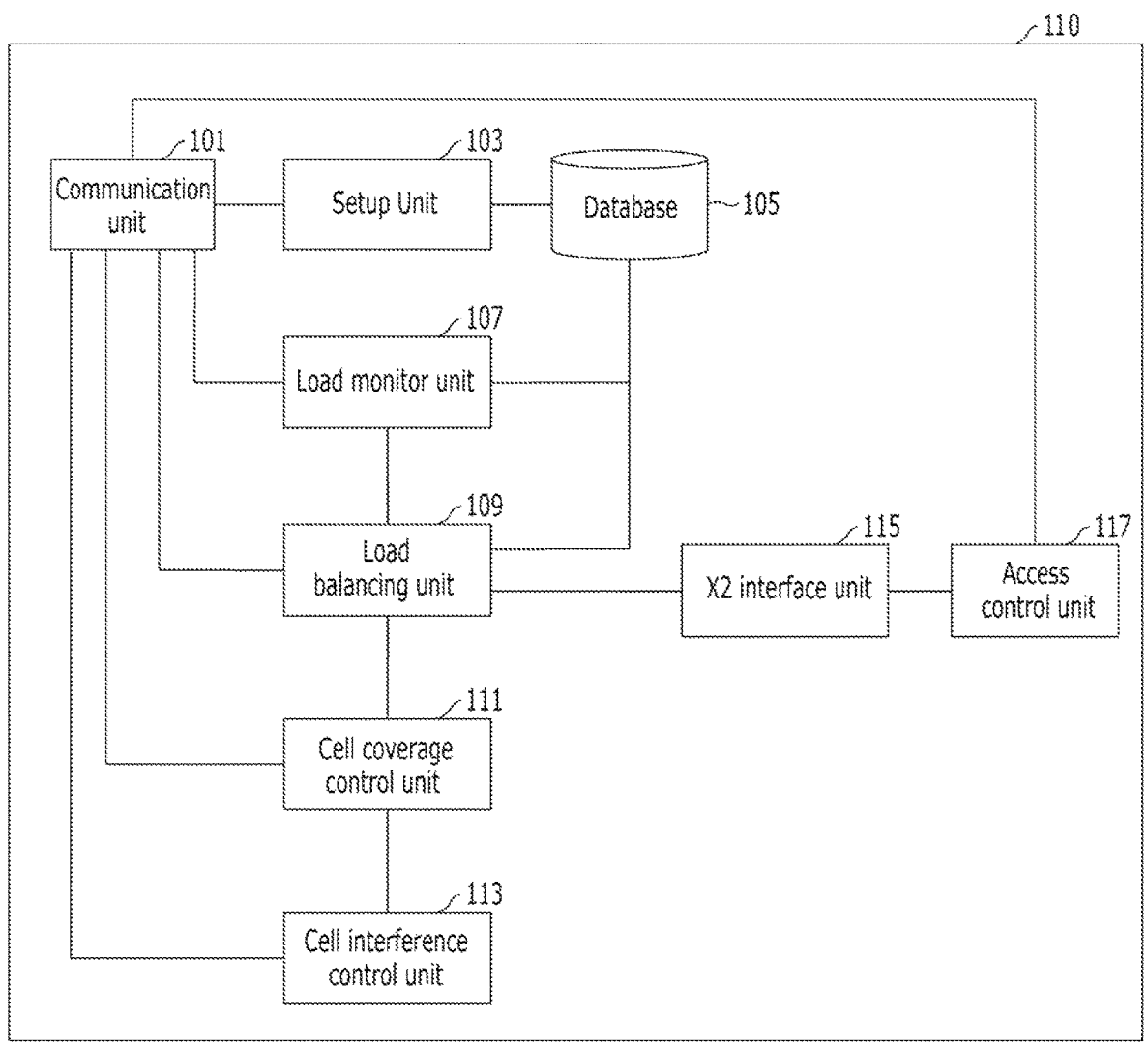
FIG. 2 shows a femtocell base station in accordance with an embodiment of the present invention.

FIG. 2 shows a femtocell base station in accordance with an embodiment of the present invention.

Referring to FIG. 2, femtocell base station 110 may include communication unit 101, setup unit 103, database 105, load monitor unit 107, load balancing unit 109, cell coverage control unit 111, cell interference control unit 113, X2 interface unit 115, and access control unit 117.

Communication unit 101 may form an Internet Protocol (IP) connection to femtocell base station management system 200 and establish a session using a certain communication protocol. According to 3GPP LTE standard specifications, the session may be established using a technical report 069 (TR-069) protocol.

Setup unit 103 may establish at least one load balancing threshold of femtocell base station 110 and store the at least one load balancing threshold in database 105. For example, setup unit 103 may receive load balancing thresholds from femtocell base station management system 200 through communication unit 101. Alternatively, setup unit 103 may receive load balancing information from femtocell base station management system 200 and establish the at least one load balancing threshold based on the received load balancing information.

The at least one load balancing threshold may include thresholds corresponding to load status items indicating a load status of a femtocell base station, for example, a central processing unit (CPU) load rate, the number of resource blocks, which may be a LTE radio resource, a traffic amount, and the number of coupled user equipment.

Load monitor unit 107 may monitor certain load status items. As described above, such load status items may include a CPU load rate, resource blocks, traffic amount, and the number of coupled user equipment, which correspond to the load balancing thresholds stored in database 105. Load monitor unit 107 may compare the monitored items with corresponding load balancing thresholds in order to determine whether the monitored items reach or exceed the corresponding load balancing thresholds. When load monitor unit 107 determines that the monitored items exceed corresponding load balancing thresholds, load monitor unit 107 may initiate action by load balancing unit 111. When load monitor unit 107 determines that the monitored load balancing items do not exceed the corresponding load balancing thresholds, load monitor unit 107 may transmit the monitored load status of femtocell base station 110 to femtocell base station management system 200 through communication unit 101.

Load balancing unit 109 may determine a target femtocell base station for handover of currently coupled user equipment to the target femtocell base station. Femtocell base station management system 200 might select the target femtocell base station. Load balancing unit 109 may be informed of the selected target femtocell base station by femtocell base station management system 200.

Load balancing unit 109 may transfer data traffic of currently coupled user equipment to the target femtocell base station through an X2 interface established with the target femtocell base station. For example, load balancing unit 109 may hand over coupled user equipment to the target femtocell base station through the X2 interface. Furthermore, load balancing unit 109 may provide a list of the currently coupled user equipment to femtocell base station management system 200 through communication unit 101.

Cell coverage control unit 111 may control cell coverage of femtocell base station 110. For example, cell coverage control unit 111 may expand or shrink the cell coverage. In order to expand the cell coverage, cell coverage control unit 111 may increase transmission power by a unit power level in response to the control of communication unit 101, load balancing unit 109, and cell interference control unit 113. In order to shrink the cell coverage, cell coverage control unit 111 may decrease transmission power by a unit power level in response to the control of communication unit 101, load balancing unit 109, and cell interference control unit 113.

In order to prevent abrupt shrinkage of the cell coverage, cell coverage control unit 111 may slowly decrease the transmission power by a unit power level, thereby minimizing influence in a service provided to user equipment 300. The abrupt increment of transmission power may act as interference to neighbor femtocells. Accordingly, cell coverage control unit 111 may also slowly increase the transmission power by a unit power level, thereby minimizing interference.

Cell interference control unit 113 may measure an amount of interference between femtocells and determine whether the measured interference amount exceeds a related threshold. When the measured interference amount exceeds the related threshold, cell interference control unit 113 may reduce the transmission power through cell coverage control unit 111. Cell interference control unit 113 may measure the interference amount during a sniffering operation. For example, cell interference control unit 113 may scan and receive signals from neighbor femtocell base station in a listening mode and measure the interference amount from the received signals. Alternatively, cell interference control unit 113 may receive the interference amount from femtocell base station management system 200.

X2 interface unit 115 may establish an X2 interface to the target femtocell base station. In order to establish the X2 interface, X2 interface unit 115 may perform an X2 setup request function and an X2 setup response function. For example, X2 interface unit 115 may transmit an X2 setup request message to the target femtocell base station through the X2 setup request function. X2 interface unit 115 may receive an X2 setup response message from the target femtocell base station in response to the X2 setup request message. By exchanging the messages, X2 interfaces may be established between femtocell base station 110 and the target femtocell base station.

Access control unit 117 may be driven when femtocell base station 110 is operated as a target femtocell base station. For example, when femtocell base station 110 is operated as a target femtocell base station, access control unit 117 may control accessing of user equipments handed over from other femtocell base station. Particularly, access control unit 117 may receive information on a list of user equipments to be handed over from other femtocell base station and subscriber information thereof from femtocell base station management system 200 through communication unit 101. The subscriber information may include a closed subscriber group (CSG) list. The CSG list may include a plurality of CSG identities each indicating a femtocell base station that user equipment can access. Access control unit 117 may first allow handover of CSG member user equipment. The CSG member user equipment may be user equipment having the same CSG identity of target base station 110 in their CSG lists. After handover of the CSG member user equipment to target femtocell base station 110 completes, access control unit 117 may allow non-CSG member user equipment handover if the number of currently coupled user equipment does not exceed the total number of allowed user equipment.

Hereinafter, an operation of serving femtocell base station 110, target femtocell base station 130, and neighbor femtocell base station 150 will be described with reference to FIG. 3 to FIG. 5, respectively.

Figure 3:
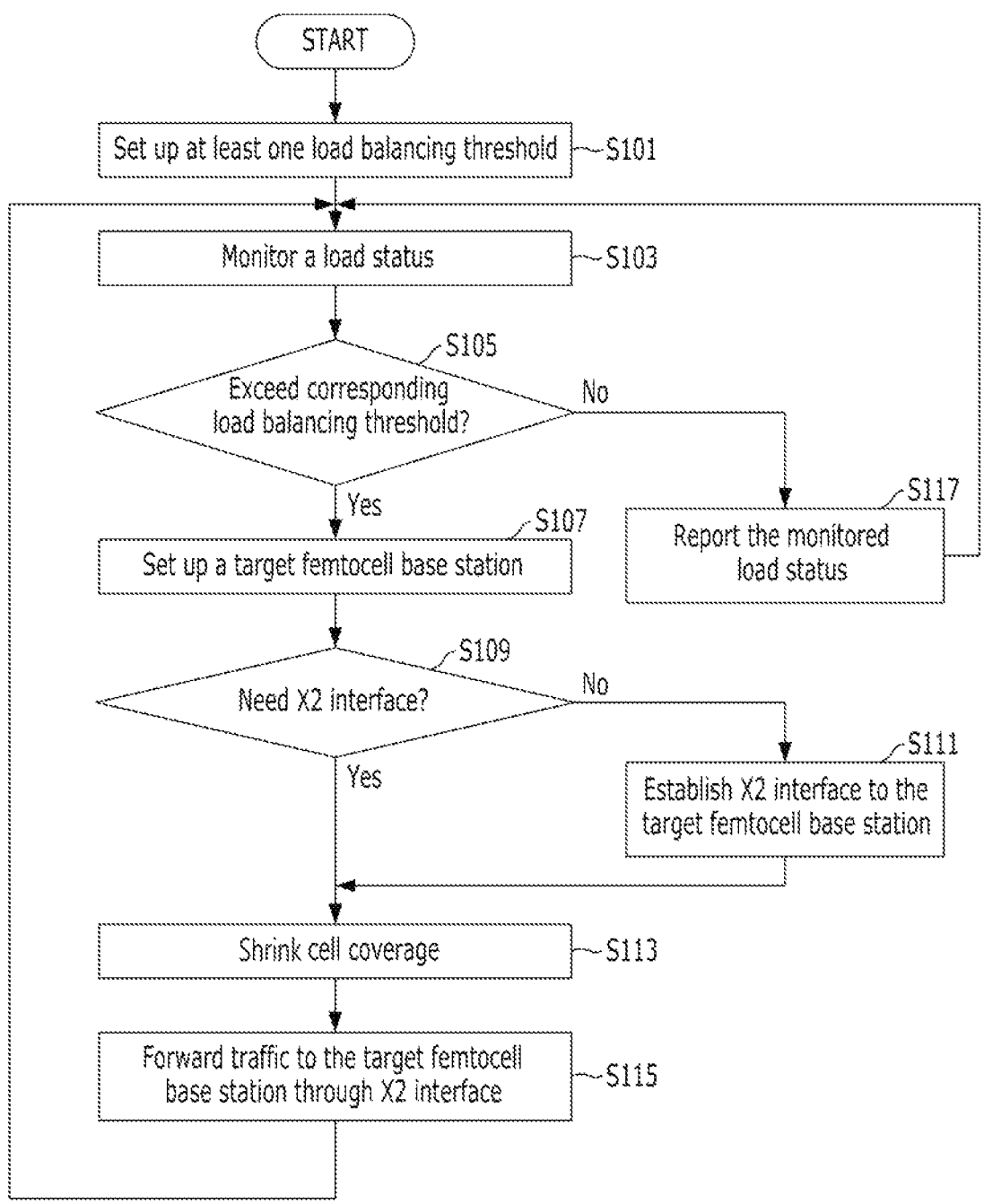
FIG. 3 shows an operation of a serving femtocell base station in accordance with an embodiment of the present invention.

FIG. 3 shows an operation of a serving femtocell base station in accordance with an embodiment of the present invention.

Referring to FIG. 3, at step S101, setup unit 103 may set up at least one load balancing threshold and store the at least one load balancing threshold in database 105. As described above, the load balancing thresholds may be received from femtocell base station management system 200. At step S103, load monitor unit 107 may monitor at least one load status item of serving femtocell base station 110 and, at step S105, determine whether the monitored load status items exceed corresponding load balancing thresholds stored in database 105.

At step S107, load balancing unit 109 may determine a target femtocell base station for handing over user equipments when the monitored load status items exceed the corresponding load balancing thresholds (Yes—S105). For example, load balancing unit 109 may select, as the target femtocell base station, one having a comparatively low load from neighbor base stations. Alternatively, femtocell base station management system 200 may select the target femtocell base station from neighbor femtocell base stations and inform load balancing unit 109 of the selected target femtocell base station through communication unit 101.

At step S109, load balancing unit 109 may determine whether an X2 interface is established to the target femtocell base station. If the X2 interface is established (Yes—S109), the operation proceeds to step S113. When the X2 interface is not established (No—S109), X2 interface unit 115 may establish an X2 interface to the target femtocell base station at step S111, and then proceed to step S113.

In order to establish the X2 interface between serving femtocell base station 110 and a target base station, serving femtocell base station 110 may request information on a target femtocell base station, such as an IP address of the target femtocell base station, to femtocell base station management system 200. Based on the provided information from femtocell base station management system 200, serving femtocell base station 110 and the target femtocell base station may be coupled through a switch and exchange necessary information and messages. Serving femtocell base station 110 and the target femtocell base station may find each other through a wired backbone network. Particularly, X2 interface unit 115 may obtain an IP address of the target femtocell base station from femtocell base station management system 200 and establish an X2 interface by exchanging messages to each other. For example, serving femtocell base station 110 may transmit an X2 setup request message to the target femtocell base station. The target femtocell base station may receive the X2 setup request message and perform a necessary operation for setting up an X2 interface. Then, the target femtocell base station may transmit an X2 setup response message to serving femtocell base station 110. Upon the receipt of the X2 setup response message, serving femtocell base station 110 may perform necessary operation for setting up an X2 interface. Accordingly, serving femtocell base station 110 and the target femtocell base station may be directly coupled to each other through X2 interface without passing through a mobility management entity (MME).

At step S113, cell coverage control unit 111 may shrink cell coverage of serving femtocell base station 110 by reducing transmission power in order to transfer user equipment to the target femtocell base station. For example, shrinking cell coverage of serving femtocell base station 110 might initiate a handover process or procedure, and user equipment currently coupled to serving femtocell base station 110 may be naturally transferred to the target femtocell base station.

At step S115, load balancing unit 109 may forward data traffic of currently coupled user equipment to the target femtocell base station through the X2 interface unit 115. For example, user equipments currently coupled to serving femtocell base station 110 may be handed over to the target femtocell base station.

When load monitor unit 107 determines that the load status items of serving femtocell base station 110 does not exceed the corresponding load balancing thresholds (No—S105), load monitor unit 107 may report the monitored load status to femtocell base station management system 200 at step S117. Based on the report, femtocell base station management system 200 may control femtocell base stations to restore original cell coverage by controlling transmission power thereof. Hereinafter, an operation of a target femtocell base station in accordance with an embodiment of the present invention.

Figure 4:
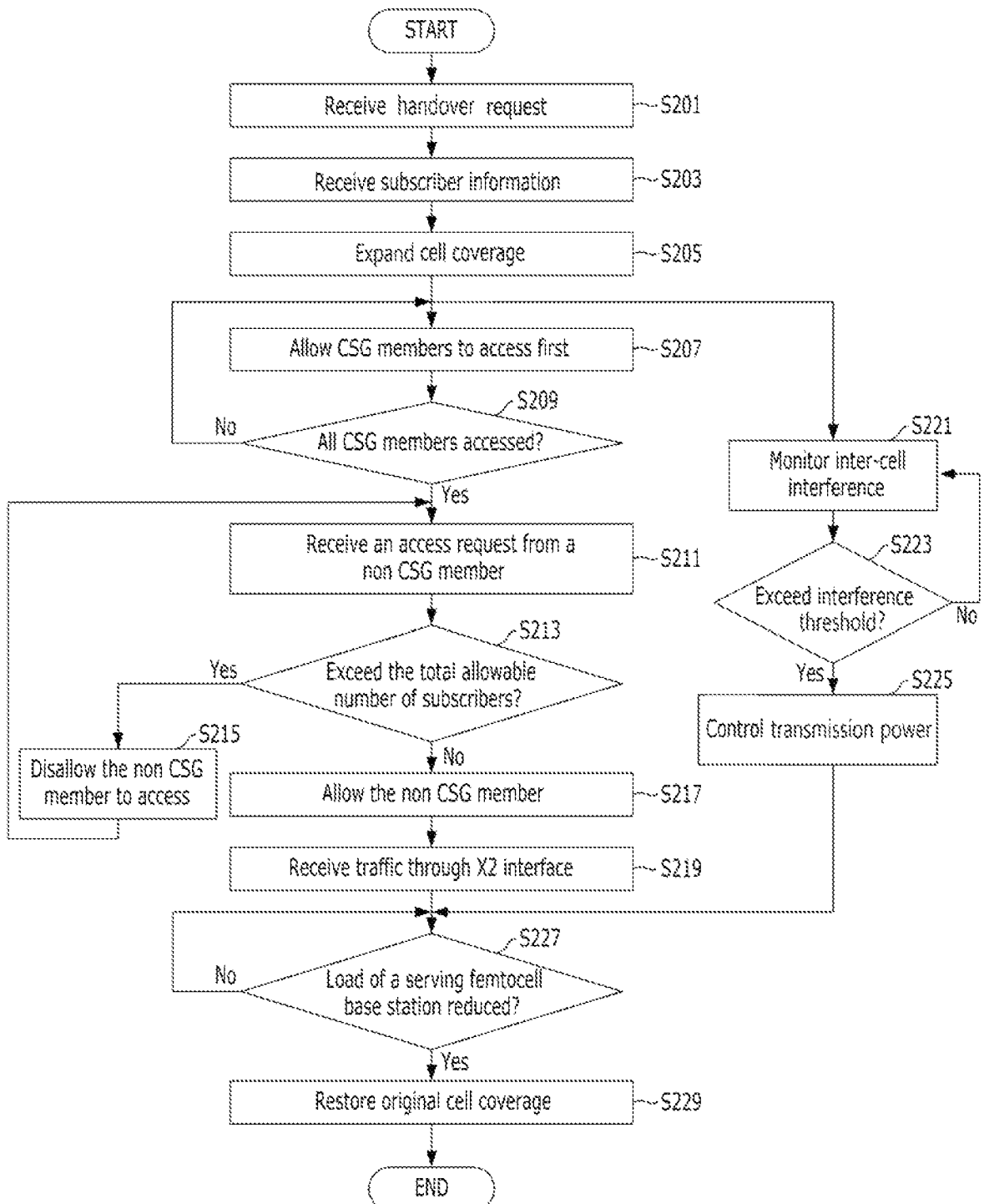
FIG. 4 shows an operation of a target femtocell base station in accordance with an embodiment of the present invention.

FIG. 4 shows an operation of a target femtocell base station in accordance with an embodiment of the present invention.

Referring to FIG. 4, at step S201, load balancing unit 109 may receive a handover request from femtocell base station management system 200 through communication unit 101. Upon the receipt of the transfer request, a femtocell base station may become a target femtocell base station.

At step S203, access control unit 117 may receive information on user equipment coupled to a serving femtocell base station and subscriber information thereof from femtocell base station management system 200 and store the received information. The subscriber information may include a CSG list of user equipment and the CSG list may include CSG identities that corresponding user equipment can access. Based on the CSG list and the CSG identities, user equipment may be classified into CSG-member user equipment and non-CSG member user equipment. For example, CSG-member user equipment can access a femtocell base station operated in a CSG mode.

At step S205, cell coverage control unit 111 may expand cell coverage by increasing transmission power. For example, by expanding cell coverage of the target femtocell base station, cell coverage control unit 111 initiate a handover procedure of user equipment.

At step S207, access control unit 117 may first allow and initiate CSG-member user equipment handover from a serving femtocell base station. The CSG-member user equipment may have the same CSG identity of the target femtocell base station in its CSG list. Handover of the CSG-member user equipment from the serving femtocell base station to the target femtocell base station may occur through the X2 interface.

At step S209, access controller 117 may determine whether all CSG member user equipment are handed over from the serving femtocell base station. If all CSG member user equipment are handed over (Yes—S209), access control unit 117 may receive an access request from non-CSG member user equipment at step S211.

Upon the receipt of the access request, access control unit 117 may determine whether the number of user equipments currently coupled to the target femtocell base station reaches or exceeds the total allowable user equipment number at step S213. The total allowable user equipment number may be determined based on various factors, such as a processing power, a bandwidth, and a current load status of the target femtocell base station. The total allowable user equipment number may be determined based on avoiding or preventing excessive load on the target femtocell base station.

When the number of currently coupled user equipment exceeds the total allowable user equipment number (Yes—S213), access control unit 117 may deny handover for non-CSG member user equipment from a serving femtocell base station to the target femtocell base station at step S215.

When the number of currently coupled user equipment does not exceed the total allowable user equipment number (No—S213), access control unit 117 may allow non-CSG member user equipment to be handed over from the serving femtocell base station to the target femtocell base station using the X2 interface S217. At step S219, load balancing unit 109 may receive traffic and/or traffic characteristics of user equipment from the serving femtocell base station through X2 interface unit 115.

When cell coverage expands at step S205, cell interference control unit 113 may monitor an interference amount to neighbor cells including a macrocell and a femtocell at step S221. Cell interference control unit 113 may determine whether the monitored interference amount exceeds a predetermined cell interference threshold at step S223.

When the monitored interference amount exceeds the cell interference threshold (Yes—S223), cell coverage control unit 111 may reduce interference by reducing or otherwise controlling transmission power by a unit power level at step S225.

At step S227, load balancing unit 109 may determine whether cell load of the serving femtocell base station was reduced in cooperation with femtocell base station management system 200. For example, femtocell base station management system 200 may obtain information on the cell load of the serving femtocell base station from the serving femtocell base station and transmit the obtained information to the target femtocell base station.

When the cell load of the serving femtocell base station is reduced, cell coverage control unit 111 may restore original cell coverage by increasing transmission power at step S229.

Hereinafter, an operation of neighbor base station will be described with reference to FIG. 5.

Figure 5:
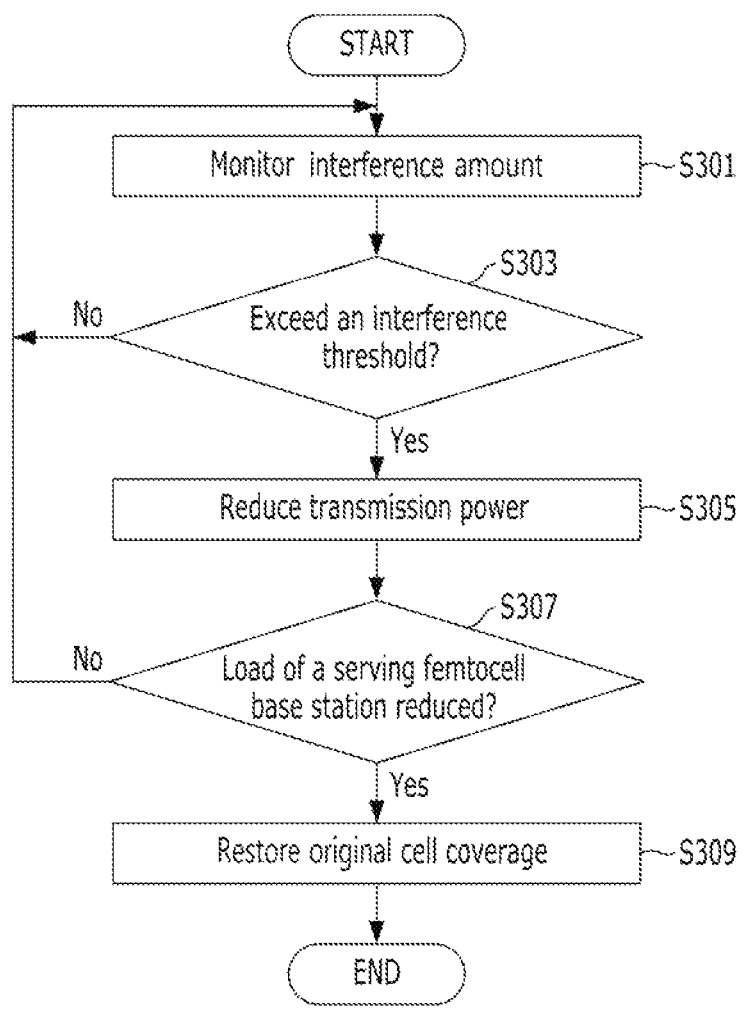
FIG. 5 shows an operation of neighbor base station in accordance with an embodiment of the present invention.

FIG. 5 shows an operation of neighbor base station in accordance with an embodiment of the present invention.

Referring to FIG. 5, cell interference control unit 113 may monitor an interference amount of neighbor cells at step S301 and determines whether the monitored interference amount reaches or exceeds an interference threshold at step S303.

When a target femtocell base station increases cell coverage, an interference amount of neighbor cell (e.g., monitored at the neighbor femtocell base station), is increased too. Accordingly, cell coverage control unit 111 may reduce cell interference by reducing transmission power for a period of time at step S305.

Load balancing unit 109 may determine whether a cell load status of the serving femtocell base station is reduced in cooperation with femtocell base station management system 200 at step S307. For example, femtocell base station may obtain information on the cell load status of the serving femtocell base station from the serving femtocell base station and transmit the obtained information to the neighbor femtocell base station.

At step S309, cell coverage control unit 111 may restore original cell coverage by increasing transmission power when the cell load status of the serving femtocell base station is reduced (Yes—S307).

Hereinafter, femtocell base station management system 200 will be described with reference to FIG. 6.

Figure 6:
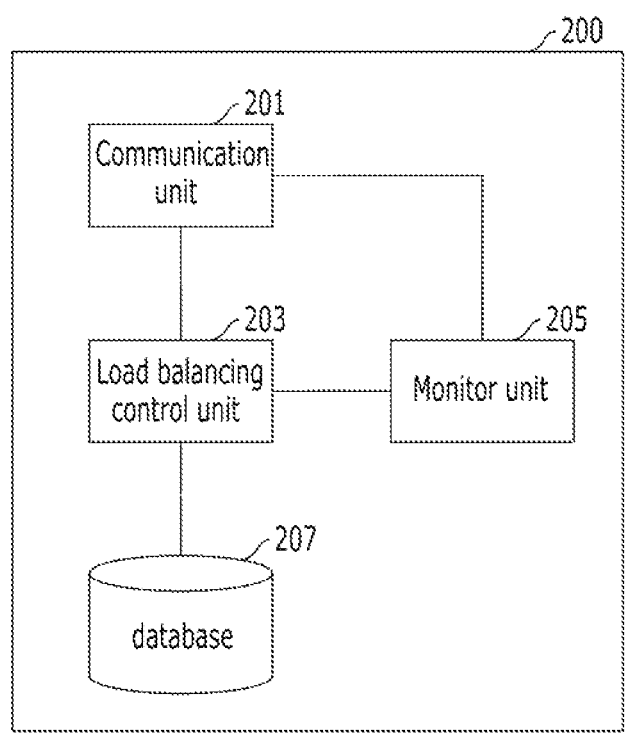
FIG. 6 shows a femtocell base station management system in accordance with an embodiment of the present invention.

FIG. 6 shows a femtocell base station management system in accordance with an embodiment of the present invention.

Referring to FIG. 6, femtocell base station management system 200 may include communication unit 201, load balancing control unit 203, monitor unit 205, and database 207.

Communication unit 201 may form an Internet Protocol (IP) connection to femtocell base stations 110, 130, and 150, and establish a session using a certain communication protocol. According to 3GPP LTE standard specifications, the session may be established using a technical report 069 (TR-069) protocol.

Load balancing control unit 203 may set up load balancing thresholds corresponding to femtocell base stations 110, 130, and 150 and provide the load balancing threshold to corresponding femtocell base stations 110, 130, and 150. Load balancing control unit 203 may select a target femtocell base station from neighbor femtocell base stations. Furthermore, load balancing control unit 203 may receive information on user equipment coupled to a serving femtocell base station and transmit the received information to the target femtocell base station.

Monitor unit 205 may receive a cell load status from load monitor unit 107 of femtocell base station 100 and manage femtocell base station 100 based on the received cell load status. Furthermore, monitor unit 205 may measure an interference amount of femtocell base stations 110, 130, and 150 and provide the measured interference amount to femtocell base stations 110, 130, and 150.

Database 207 may receive information on user equipment coupled to femtocell base station, including a CSG list, from femtocell base stations 110, 130, and 150 and store the received information.

Figure 7:
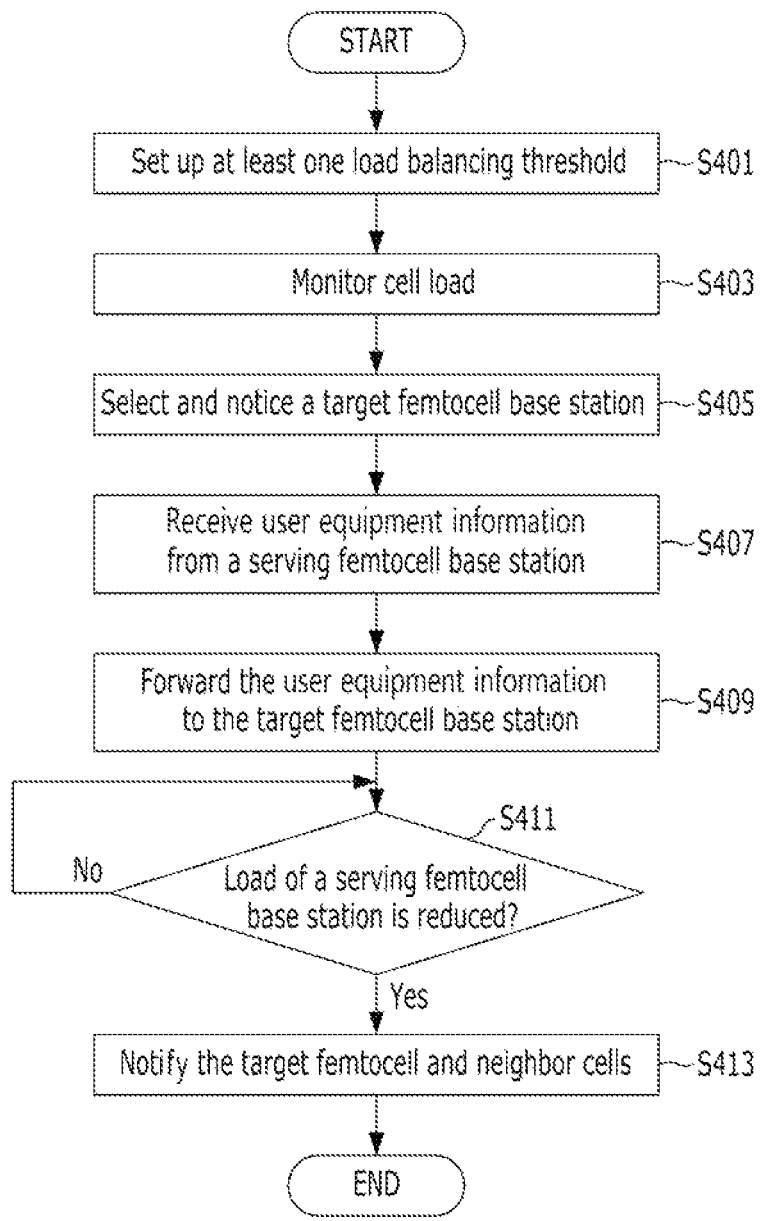
FIG. 7 shows an operation of a femtocell base station management system in accordance with an embodiment of the present invention.

FIG. 7 shows an operation of a femtocell base station management system in accordance with an embodiment of the present invention.

Referring to FIG. 7, load balancing control unit 203 may set up load balancing thresholds and transmit the load balancing thresholds to a plurality of femtocell base stations at step S401.

At step S403, monitor unit 205 may receive cell load statuses from femtocell base stations 110, 130, and 150 and manage the plurality of femtocell base stations 110, 130, and 150 based on the received cell load statuses.

At step S405, load balancing control unit 203 may select a target femtocell base station according to a request of a serving femtocell base station having a cell load status exceeding a related threshold. Then, load balancing control unit 203 may notice the serving femtocell base station of the selected target femtocell base station. For example, one having a comparatively low cell load status may be selected as the target femtocell base station from neighbor femtocell base stations of the serving femtocell base station based on the received cell load status.

At step S407, load balancing control unit 203 may receive information on user equipment coupled to the serving femtocell base station from the serving femtocell base station. At step S409, load balancing control unit 203 may transmit the received information to the target femtocell base station with a CSG list stored in database 207.

At step S411, monitor unit 205 may determine whether a cell load status of the serving femtocell base station is reduced. When the cell load status of the serving femtocell base station is reduced, load balancing control unit 203 may notify the target femtocell base station and the neighbor femtocell base stations that the cell load status of the serving femtocell base station is reduced at step S413 in order to induce the target femtocell base station and the neighbor femtocell base station to control cell coverage.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for load balancing in femtocells at a femtocell base station, the method comprising:
   determining whether a cell load status of the femtocell base station exceeds a certain load level, wherein the cell load status is at least one of a central processing unit (CPU) load rate, a number of resource blocks, a traffic amount, and a number of user equipments coupled to the femtocell base station;
   determining, based on information received from a femtocell base station management system, the target femtocell base station from neighbor femtocell base stations;
   establishing an X2 interface directly from the femtocell base station to the target femtocell base station; and
   initiating handover of at least one user equipment coupled to the femtocell base station to the target femtocell base station by shrinking cell coverage of the femtocell base station when the cell load status of the femtocell base station exceeds the certain load level, wherein the establishing an X2 interface includes:

requesting cell information of the target femtocell base station to the femtocell base station management system and receiving the requested cell information from the femtocell base station management system;

transmitting an X2 interface setup request message to the target femtocell base station based on the received cell information of the target femtocell base station; and receiving an X2 interface setup response message from the target femtocell base station in response to the X2 interface setup request message, wherein the determining whether a cell load status of the femtocell base station exceeds a certain load level includes:

monitoring the at least one load status item of the femtocell base station;

comparing the monitored at least one load status item with a related threshold; and determining whether the cell load status of the femtocell base station reaches a certain load level based on the comparison result.

2. The method of claim 1, wherein the determining the target femtocell base station comprises:

selecting the target femtocell base station by the femtocell base station management system; and receiving, by the femtocell base station management system, cell load statuses from the neighbor base stations, selecting one having a lowest cell load status as the target femtocell base station among the neighbor base stations, and informing the femtocell base station of the selected target femtocell base station.

3. The method of claim 1, wherein handover of the at least one user equipment coupled to the first femtocell base station to the target femtocell base station is through establishing the X2 interface between the femtocell base station and the target femtocell base station.

4. The method of claim 1, wherein in the shrinking cell coverage of the femtocell base station, reducing transmission power of the first femtocell base station by a unit power level.

5. The method of claim 1, comprising:

reporting the cell load status of the femtocell base station to a femtocell base station management system when the cell load status of the femtocell base station based on the certain load level.

6. A femtocell base station comprising:

a monitor unit configured to determine whether a cell load status of the femtocell base station reaches a certain load level;

a cell coverage control unit configured to shrink cell coverage of the femtocell base station when the cell load status reaches the certain load level by reducing transmission power of the femtocell base station and expand cell coverage of the femtocell base station by increasing transmission power of the femtocell base station by a unit power level in response to a request from at least one of a serving femtocell base station and a femtocell base station management system;

an access control unit configured to provide handover information to at least one user equipment coupled to the femtocell base station in order to handover the at least one user equipment to a target base station through an X2 interface when the cell coverage is shrunk by the cell coverage control unit; and an X2 interface unit configured to establish the X2 interface directly from the femtocell base station to the target femtocell base station, wherein the X2 interface unit is configured to:

request cell information of the target femtocell base station to a femtocell base station management system;

receive the requested cell information from the femtocell base station management system;

transmit an X2 interface setup request message to the target femtocell base station based on the received cell information of the target femtocell base station; and receive an X2 interface setup response message from the target femtocell base station in response to the X2 interface setup request message, thereby establishing the X2 interface directly to the target femtocell base station wherein the monitor unit is configured to:

monitor the at least one load status item of the femtocell base station;

compare the monitored at least one load status item with a related threshold; and determine whether the cell load status of the femtocell base station reaches a certain load level based on the comparison result.

7. The femtocell base station of claim 6, wherein the access control unit is configured to:

allow handover access of user equipment having a closed subscriber group (CSG) identity identical to that of the femtocell base station first among the user equipment handed over from the serving femtocell base station; and deny handover access of user equipment not having the CSG identity when a number of user equipment currently coupled to the femtocell base station exceeds a total allowable number, wherein the CSG identity is included in a CSG list stored in each user equipment and the subscriber information of the user equipments includes information on the CSG identity and the CSG list.

8. The femtocell base station of claim 6, further comprising a cell interference control unit configured to:

measure an interference amount of neighbor cells of the femtocell base station after expanding the cell coverage of the femtocell base station; and reduce transmission power of the femtocell base station by a unit power level when the measured interference amount exceeds a related threshold.

* * * * *